(12) United States Patent
Maier

(10) Patent No.: US 8,148,842 B2
(45) Date of Patent: Apr. 3, 2012

(54) ELECTRICAL POWER GENERATION SYSTEM HAVING MULTIPLE SECONDARY POWER DISTRIBUTION ASSEMBLIES WITH INTEGRAL POWER CONVERSION

(75) Inventor: Josef Maier, Munningen (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/358,870

(22) Filed: Feb. 20, 2006

(65) Prior Publication Data
US 2007/0194625 A1   Aug. 23, 2007

(51) Int. Cl.
*B60L 1/00* (2006.01)
(52) U.S. Cl. .......................................... 307/9.1
(58) Field of Classification Search .................. 307/11, 307/21, 22, 9.1
See application file for complete search history.

(56) References Cited

U.S. PATENT DOCUMENTS

| | | | | |
|---|---|---|---|---|
| 5,477,091 | A * | 12/1995 | Fiorina et al. | 307/66 |
| 5,939,800 | A * | 8/1999 | Artinian et al. | 307/64 |
| 6,856,045 | B1 * | 2/2005 | Beneditz et al. | 307/43 |
| 2003/0102720 | A1 * | 6/2003 | Baggs et al. | 307/149 |
| 2003/0230934 | A1 * | 12/2003 | Cordelli et al. | 307/43 |
| 2007/0029879 | A1 * | 2/2007 | Eldredge | 307/18 |
| 2008/0012423 | A1 * | 1/2008 | Mimran | 307/11 |

* cited by examiner

*Primary Examiner* — Michael Rutland Wallis
(74) *Attorney, Agent, or Firm* — Stephen G. Mican

(57) ABSTRACT

An improved EPGS with an integrated electrical system architecture uses SPDAs with localised power converters to provide the necessary types of power to their respective electrical loads so that a single type of primary power bus may be used to connect its PDAs to respective SPDAs.

20 Claims, 3 Drawing Sheets

ELECTRICAL POWER GENERATION SYSTEM HAVING MULTIPLE SECONDARY POWER DISTRIBUTION ASSEMBLIES WITH INTEGRAL POWER CONVERSION

FIELD OF THE INVENTION

The invention relates to an aeronautical electrical power generation system (EPGS), and more particularly to an EPGS that has an integrated electrical system architecture.

BACKGROUND OF THE INVENTION

An EPGS with an integrated electrical system architecture typically includes primary power distribution assemblies (PDAs) and secondary power distribution assemblies (SPDAs). Components such as generator control units (GCUs), transformer rectifier units (TRUs), contactors, circuit breakers, primary power distribution relays and circuit protection are integrated as modular assemblies within the PDAs.

The SPDAs distribute, control and protect electrical power using solid-state power controllers (SSPCs). The SPDAs are designed such that redundant microprocessors and input/output (I/O) allow them to perform utility management and remote data concentration functions as well. Both the PDAs and SPDAs are built as modular assemblies to reduce the time required removing and replacing components. In addition, each SPDA has the ability to host third party utility modules from other suppliers, or to integrate their utility functions entirely within the SPDAs embedded common hardware to perform a variety of control functions, including those of hydraulic systems, fuel systems, and air management systems. As a result, the integrated electrical system architecture has many fewer parts, fewer interfaces, shorter wiring runs, lower weight, higher maintainability, higher reliability and lower cost than non-integrated system architectures.

As indicated above, each PDA in such an EPGS integrated system architecture has an integrated TRU. The TRU serves the purpose of converting generated alternating current (AC) to direct current (DC) that is fed to a primary DC bus for transmission to at least one SPDA. Each PDA also directs the generated AC to a primary AC bus. Each SPDA then controls power to respective loads attached to the SPDA that it receives from the primary DC bus and the primary AC bus. Since the SPDAs are spread around the aircraft to be near their respective loads, the two primary busses for each PDA, AC and DC, must be spread through the aircraft as well. There would be a further savings in cost and weight as well as an improvement in reliability if only one primary bus could serve its respective SPDA. However, both AC and DC are needed by various loads throughout most aircraft.

SUMMARY OF THE INVENTION

The invention comprises an EPGS that converts one type of power to another locally in the SPDAs so that only one type of power on the primary busses is needed. The SPDAs convert power from the one type of power on the primary busses to any other type of power needed for their respective loads. Reducing primary busses to one type of power and locally converting power as needed in the SPDAs reduces cost and weight of the aircraft and it reduces complexity and improves reliability of the EPGS.

Generally, the invention comprises an electrical power generating system (EPGS) with an integrated electrical system architecture that has at least one electrical power source, comprising: a primary power distribution assembly (PDA) for each electrical power source that distributes power of one type to a single corresponding primary bus; and at least one secondary power distribution assembly (SPDA) for each PDA that receives the power of one type on the single corresponding primary bus and distributes power of at least one other type to at least some respective electrical loads for each SPDA.

DETAILED DESCRIPTION OF THE INVENTION

Figure 1:
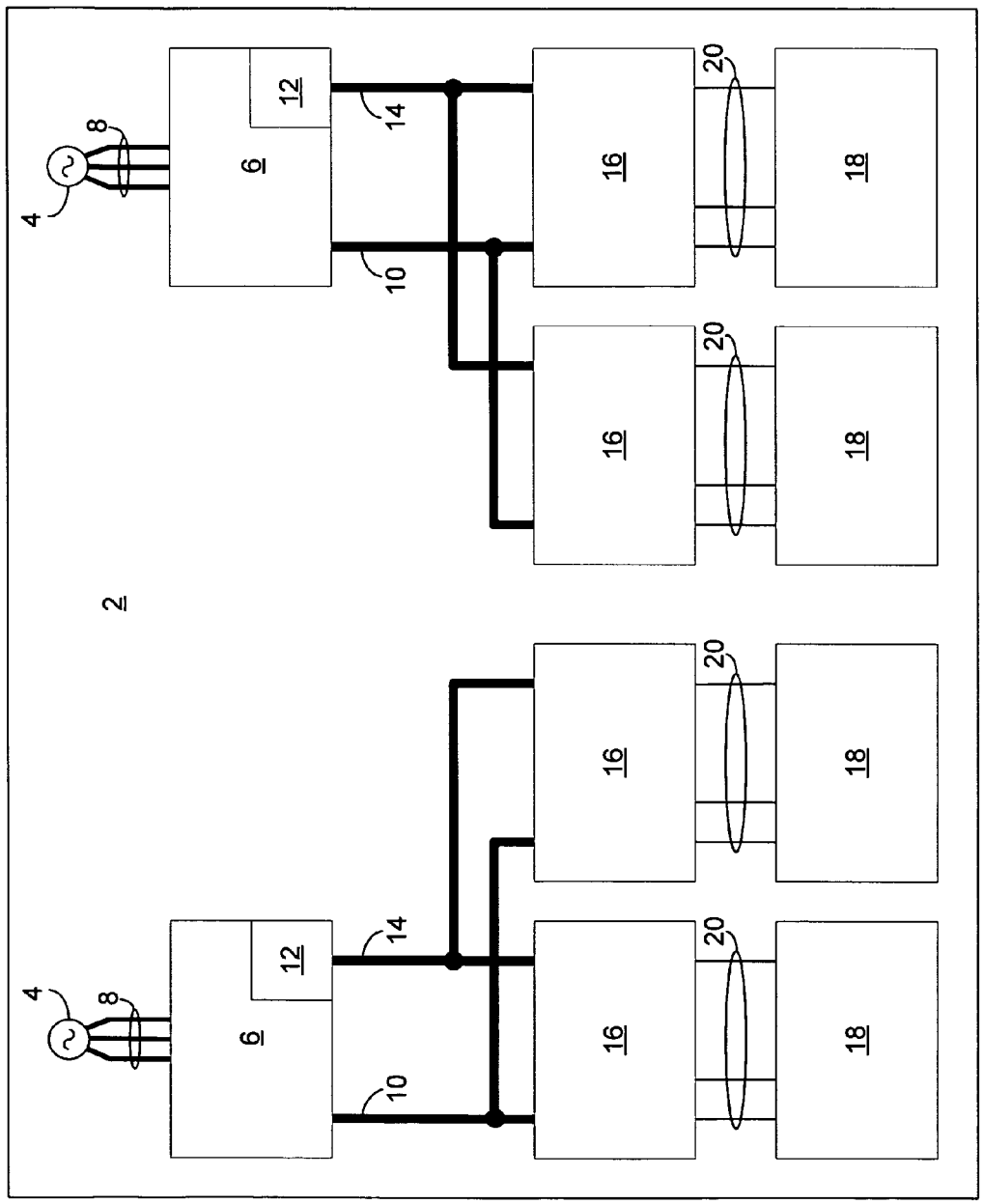
FIG. 1 is a simplified block diagram of a typical EPGS according to the prior art.

FIG. 1 is a simplified block diagram of a typical EPGS 2 with integrated electrical system architecture according to the prior art. The EPGS 2 has at least one AC power source 4, such as a three-phase generator, and typically two power sources 4, as shown in FIG. 1. Each power source 4 feeds a corresponding PDA 6 by way of a three-phase power feeder 8. Each PDA 6 provides regulated AC output on an associated primary AC bus 10. Aircraft generally have at least some loads that require DC power. Consequently, each PDA 6 comprises an AC/DC converter or TRU 12 that provides regulated DC output on an associated primary DC bus 14.

An aircraft generally has AC and DC loads that are distributed throughout its airframe. The integrated electrical system architecture of the EPGS 2 feeds localised SPDAs 16 by way of the primary AC busses 10 and the primary DC busses 14 to power respective electrical loads 18 by way of localised feeders 20. There may be one or more SPDA 16 for each PDA 6. Two SPDAs 16 for each PDA 6 are shown in FIG. 1 only by way of illustration. As described above, such a prior art EPGS 2 requires the primary DC busses 14 to feed SPDAs 16 throughout the airframe of an aircraft. This increases complexity, cost and weight of the entire integrated electrical system architecture for the EPGS 2 compared to a comparable system that does not require the primary DC busses 14.

Figure 2:
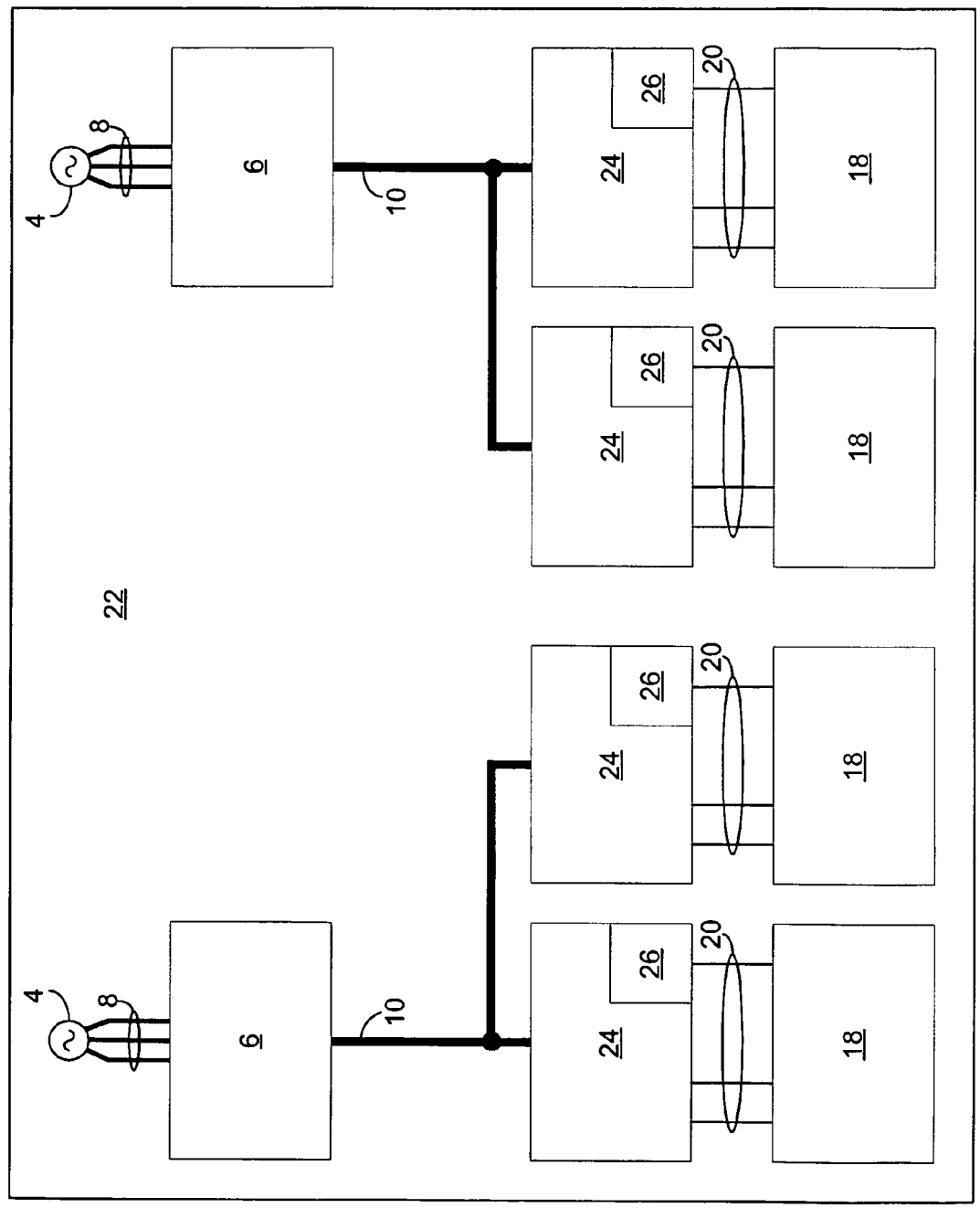
FIG. 2 is a simplified block diagram of an EPGS according to a first possible embodiment of the invention.

FIG. 2 is a simplified block diagram of an EPGS 22 according to a first possible embodiment of the invention. In function, it is similar to the EPGS 2 described above in connection with FIG. 1, but the primary DC busses 14 are eliminated. In this case, each PDA 6 only provides one type of power to a single primary bus, such as a respective primary AC bus 10. The primary AC busses 10 alone feed localised SPDAs 24 according to this embodiment of the invention. Each SPDA 24 has its own localised power converter 26 that locally converts the type of power provided by its respective primary AC bus 10 to another type of power needed for respective electrical loads 18 that require it, such as DC, by way of their respective localised feeders 20. For converting the AC power on the primary AC bus 10 to DC, each power converter 26 may comprise a TRU. The power converter 26 may generally comprise an electronic power converter or TRU that converts AC to DC, DC to DC and DC to AC. Just as in the case of the EPGS 2 described above in connection with FIG. 1, the EPGS 22 has at least one SPDA 24 for each PDA 6. Two SPDAs 24 for each PDA 6 are shown in FIG. 2 only by way of illustration.

The localised power converter 26 in each SPDA 24 is preferably sized for the expected load requirements of its respective electrical loads 18. Thus, each localised power converter 26 is lighter, smaller and less costly than a TRU 12 that is part of a PDA 6 as required in the EPGS 2 described above in connection with FIG. 1. The elimination of the primary DC busses 14 combined with the integration of a small, lightweight and inexpensive localised power converter 26 into each SPDA 24 reduces weight cost and complexity of the EPGS 22 according to the invention compared to prior art designs such as the EPGS 2 described above in connection with FIG. 1. Furthermore, the elimination of the primary DC busses 14 reduces complexity and increases reliability of the integrated electrical system architecture.

Figure 3:
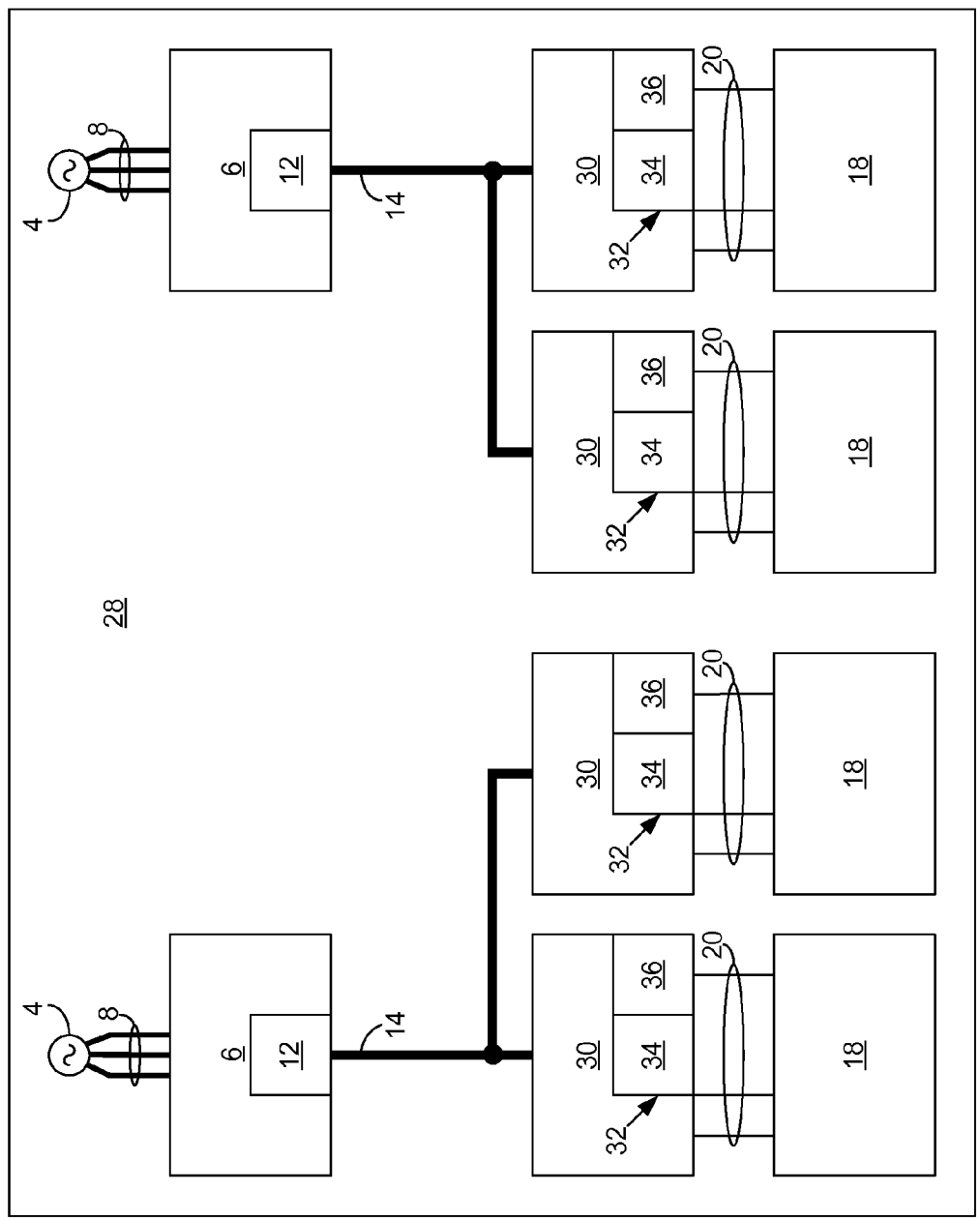
FIG. 3 is a simplified block diagram of an EPGS according to a second possible embodiment of the invention.

Of course, the invention may alternately use primary DC busses 14 instead of primary AC busses 10 for distribution of power in an integrated electrical system architecture. FIG. 3 is a simplified block diagram of an EPGS 28 according to a second possible embodiment of the invention. In this case, each PDU 6 has a TRU 12 that converts AC power generated by its respective AC power source 4 to DC of high electrical potential on its respective primary DC bus 14. Generating power at a high electrical potential minimises current in the primary DC busses 14, thereby allowing relatively thin gauge conductors to be used for the primary DC busses without excessive loss.

The primary AC busses 14 alone feed localised SPDAs 30 according to this embodiment of invention. Each SPDA 30 has its own localised power converter 32 that locally converts the power provided by its respective primary DC bus 14 to other types of power needed for respective electrical loads 18 that require it, such as low electrical potential AC and DC, by way of their respective localised feeders 20. In other words, if both AC and DC are required by respective electrical loads 18, the localised power converter 32 may comprise a DC/AC converter 34 and DC/DC converter 36. The power converter 32 may generally comprise an electronic power converter or TRU that converts AC to DC, DC to DC and DC to AC. Just as in the case of the EPGS 22 described above in connection with FIG. 2, the EPGS 28 has at least one SPDA 30 for each PDA 6, and two SPDAs 30 for each PDA 6 are shown in FIG. 3 only by way of illustration.

The localised power converter 32 in each SPDA 30 is preferably sized for the expected load requirements of its respective electrical loads 18 so that it is relatively light, small and inexpensive. Each TRU 12 that is part of a PDA 6 that must supply DC to a primary DC bus 10 is also relatively light, small and inexpensive, since it need only produce moderate levels of current due to producing a high electrical potential. The elimination of the primary AC busses 10 combined with the integration of a small, lightweight and inexpensive localised power converter 32 into each SPDA 30 reduces weight cost and complexity of the EPGS 28 according to the invention compared to prior art designs such as the EPGS 2 described above in connection with FIG. 1. Furthermore, the elimination of the primary AC busses 10 reduces complexity and increases reliability of the integrated electrical system architecture.

Described above is an improved EPGS with an integrated electrical system architecture that uses SPDAs with localised power converters to provide the necessary types of power to their respective electrical loads so that a single type of primary power bus may be used to connect its PDAs to respective SPDAs. It should be understood that this embodiment is only an illustrative implementation of the invention, that the various parts and arrangement thereof may be changed or substituted, and that the invention is only limited by the scope of the attached claims.

What is claimed is:

1. An electrical power generating system (EPGS) for an aircraft with an integrated electrical system architecture that has at least one electrical power source aboard the aircraft, comprising:

a primary power distribution assembly (PDA) aboard the aircraft for each electrical power source that distributes power of one type to a single corresponding primary bus; and at least one secondary power distribution assembly (SPDA) aboard the aircraft for each PDA that receives only the power of one type on the single corresponding primary bus, converts power of the one type to converted power of multiple other types, wherein at least one type of converted power is a type of AC power and distributes the converted power of the multiple other types to at least some respective electrical loads for each SPDA.

2. The EPGS of claim 1, wherein the type of power that each PDA distributes to its single corresponding primary bus is AC.

3. The EPGS of claim 2, wherein one other type of power that each SPDA distributes to at least some of its respective electrical loads is DC.

4. The EPGS of claim 3, wherein each SPDA comprises a power converter for converting AC power that it receives from its corresponding single primary power bus to DC for at least some of its respective electrical loads.

5. The EPGS of claim 4, wherein each power converter comprises a transformer rectifier unit (TRU).

6. The EPGS of claim 1, wherein the type of converted power that each PDA distributes to its single corresponding primary bus is DC of high electrical potential.

7. The EPGS of claim 6, wherein one other type of converted power that each SPDA distributes to at least some of its respective electrical loads is AC.

8. The EPGS of claim 7, wherein each SPDA comprises a power converter for converting DC power of high electrical potential that it receives from its corresponding single primary power bus to AC for at least some of its respective electrical loads.

9. The EPGS of claim 8, wherein each power converter comprises a DC/AC converter.

10. The EPGS of claim 6, wherein one other type of converted power that each SPDA distributes to at least some of its respective electrical loads is DC of lower electrical potential.

11. The EPGS of claim 10, wherein each power converter comprises a DC/DC converter.

12. The EPGS of claim 7, wherein one other type of converted power that each SPDA distributes to at least some of its respective electrical loads is AC, and another type of converted power that each SPDA distributes to at least some of its respective electrical loads is DC of lower electrical potential.

13. The EPGS of claim 12, wherein each SPDA comprises a power converter for converting DC power of high electrical potential that it receives from its corresponding single primary power bus to AC and DC of lower electrical potential for at least some of its respective electrical loads.

14. The EPGS of claim 13, wherein each power converter comprises a DC/AC and DC/DC converter.

15. An electrical power generating system (EPGS) for an aircraft with an integrated electrical system architecture that has at least one electrical power source aboard the aircraft, comprising:

a primary power distribution assembly (PDA) aboard the aircraft for each electrical power source that distributes AC power to a single corresponding primary bus; and at least one secondary power distribution assembly (SPDA) aboard the aircraft for each PDA that comprises a power converter that receives only the AC power on the single corresponding primary bus, simultaneously converts it to multiple types of converted power, wherein at least one type of converted power is a type of DC power and distributes the converted DC power to at least some respective electrical loads for each SPDA.

16. The EPGS of claim 15, The EPGS of claim 15, wherein each power converter comprises a transformer rectifier unit (TRU).

17. An electrical power generating system (EPGS) for an aircraft with an integrated electrical system architecture that has at least one electrical power source aboard the aircraft, comprising:

a primary power distribution assembly (PDA) aboard the aircraft for each electrical power source that distributes DC power of high electrical potential to a single corresponding primary bus; and at least one secondary power distribution assembly (SPDA) aboard the aircraft for each PDA that comprises a power converter that receives only DC power of high electrical potential on the single corresponding primary bus, simultaneously converts it to multiple types of power, wherein at least one type of converted power is a type of AC power and distributes the converted AC power to at least some respective electrical loads for each SPDA.

18. The EPGS of claim 17, wherein each power converter comprises a DC/AC converter.

19. An electrical power generating system (EPGS) for an aircraft with an integrated electrical system architecture that has at least one electrical power source aboard the aircraft, comprising:

a primary power distribution assembly (PDA) aboard the aircraft for each electrical power source that distributes DC power of high electrical potential to a single corresponding primary bus; and at least one secondary power distribution assembly (SPDA) aboard the aircraft for each PDA that comprises a power converter that receives only DC power of high electrical potential on the single corresponding primary bus, simultaneously converts it to multiple types of power, wherein two types of converted power comprise AC and DC power of lower electrical potential and distributes the converted AC and DC power of lower electrical potential to at least some respective electrical loads for each SPDA.

20. The EPGS of claim 19, wherein each power converter comprises a DC/AC and DC/DC converter.

* * * * *